(12) United States Patent
Peng

(10) Patent No.: US 11,782,245 B2
(45) Date of Patent: Oct. 10, 2023

(54) CAMERA OPTICAL LENS INCLUDING FIVE LENSES OF +−+− OR +−++− REFRACTIVE POWERS

(71) Applicant: AAC Optics (Changzhou) Co., Ltd., Changzhou (CN)

(72) Inventor: Haichao Peng, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 519 days.

(21) Appl. No.: 17/129,951

(22) Filed: Dec. 22, 2020

(65) Prior Publication Data
US 2021/0382276 A1    Dec. 9, 2021

(30) Foreign Application Priority Data
Jun. 9, 2020   (CN) .......................... 202010515335.2

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

| | | | | |
|---|---|---|---|---|
| 2013/0077181 A1* | 3/2013 | Chen | .................. | G02B 13/0045 359/714 |
| 2016/0161718 A1* | 6/2016 | Koreeda | ............ | G02B 13/0045 359/714 |
| 2021/0132341 A1* | 5/2021 | Xiao | ........................ | G02B 9/64 |

\* cited by examiner

*Primary Examiner* — Wen Huang
(74) *Attorney, Agent, or Firm* — W&G Law Group

(57) ABSTRACT

Provided is a camera optical lens including, from an object side to an image side: a first lens having a positive refractive power, a second lens having a negative refractive power, a third lens, a fourth lens having a positive refractive power, and a fifth lens having a negative refractive power. The camera optical lens satisfies following conditions: $58.00 \leq v1 \leq 82.00$, and $-5.50 \leq f2/f \leq -3.50$, where f denotes a focal length of the camera optical lens, f2 denotes a focal length of the second lens, and v1 denotes an abbe number of the first lens. The camera optical lens according to the present disclosure has better optical performance while satisfying design requirements for ultra-thin, wide-angle lenses having large apertures.

10 Claims, 7 Drawing Sheets

CAMERA OPTICAL LENS INCLUDING FIVE LENSES OF +−+− OR +−++− REFRACTIVE POWERS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the development of camera technology, camera optical lenses are widely applied in various electronic products, such as smart phones and digital cameras. For the purpose of portability, people are increasingly pursuing thinner and lighter electronic products, and thus miniature camera lenses with good imaging quality therefore have become a mainstream in the market.

In order to obtain better imaging quality, the lens that is conventionally equipped in mobile phone cameras adopts a three-piece or four-piece lens structure. However, with the development of technology and the increase of the diverse demands of users, and as the pixel area of photosensitive devices is becoming smaller and smaller and the requirement of the system on the imaging quality is improving constantly, a five-piece lens structure gradually emerges in lens designs. Although the common five-piece lens has good optical performance, its settings on refractive power, lens spacing and lens shape still have some irrationality, which results in that the lens structure cannot achieve a high optical performance while satisfying design requirements for wide-angle and ultra-thin lenses.

Therefore, it is urgent to provide a camera optical lens that has good optical performance and satisfies the requirements for large-aperture, wide-angle, and ultra-thin design.

SUMMARY

In view of the above problems, the present disclosure provides a camera optical lens, which can solve the problem that conventional camera optical lenses are not fully ultra-thinned, large-apertured and wide-angled.

In an embodiment, the present disclosure provides a camera optical lens including, from an object side to an image side: a first lens having a positive refractive power, a second lens having a negative refractive power, a third lens, a fourth lens having a positive refractive power, and a fifth lens having a negative refractive power. The camera optical lens satisfies following conditions: $58.00 \leq v1 \leq 82.00$, and $-5.50 \leq f2/f \leq -3.50$, where f denotes a focal length of the camera optical lens, f2 denotes a focal length of the second lens, and v1 denotes an abbe number of the first lens.

As an improvement, the camera optical lens further satisfies $0.80 \leq d6/d8 \leq 1.20$, where d6 denotes an on-axis distance from an image side surface of the third lens to an object side surface of the fourth lens, and d8 denotes an on-axis distance from an image side surface of the fourth lens to an object side surface of the fifth lens.

As an improvement, the camera optical lens further satisfies $3.00 \leq R9/R10 \leq 6.00$, where R9 denotes a curvature radius of an object side surface of the fifth lens, and R10 denotes a curvature radius of an image side surface of the fifth lens.

As an improvement, the camera optical lens further satisfies $0.50 \leq f1/f \leq 1.61$, $-4.22 \leq (R1+R2)/(R1-R2) \leq -1.27$, and $0.07 \leq d1/TTL \leq 0.23$, where f1 denotes a focal length of the first lens, R1 denotes a curvature radius of an object side surface of the first lens, R2 denotes a curvature radius of an image side surface of the first lens, d1 denotes an on-axis thickness of the first lens, and TTL denotes a total optical length from the object side surface of the first lens to an image plane of the camera optical lens along an optic axis.

As an improvement, the camera optical lens further satisfies $1.20 \leq (R3+R4)/(R3-R4) \leq 11.57$, and $0.02 \leq d3/TTL \leq 0.07$, where R3 denotes a curvature radius of an object side surface of the second lens, R4 denotes a curvature radius of an image side surface of the second lens, d3 denotes an on-axis thickness of the second lens, and TTL denotes a total optical length from an object side surface of the first lens to an image plane of the camera optical lens along an optic axis.

As an improvement, the camera optical lens further satisfies $-140.37 \leq f3/f \leq 72.19$, $1.41 \leq (R5+R6)/(R5-R6) \leq 18.52$, and $0.04 \leq d5/TTL \leq 0.16$, where f3 denotes a focal length of the third lens, R5 denotes a curvature radius of an object side surface of the third lens, R6 denotes a curvature radius of an image side surface of the third lens, d5 denotes an on-axis thickness of the third lens, and TTL denotes a total optical length from an object side surface of the first lens to an image plane of the camera optical lens along an optic axis.

As an improvement, the camera optical lens further satisfies $0.43 \leq f4/f \leq 1.43$, $0.33 \leq (R7+R8)/(R7-R8) \leq 1.48$, and $0.06 \leq d7/TTL \leq 0.20$, where f4 denotes a focal length of the fourth lens, R7 denotes a curvature radius of an object side surface of the fourth lens, R8 denotes a curvature radius of an image side surface of the fourth lens, d7 denotes an on-axis thickness of the fourth lens, and TTL denotes a total optical length from an object side surface of the first lens to an image plane of the camera optical lens along an optic axis.

As an improvement, the camera optical lens further satisfies $-1.46 \leq f5/f \leq -0.45$, $0.70 \leq (R9+R10)/(R9-R10) \leq 2.73$, and $0.03 \leq d9/TTL \leq 0.11$, where f5 denotes a focal length of the fifth lens, R9 denotes a curvature radius of an object side surface of the fifth lens, R10 denotes a curvature radius of an image side surface of the fifth lens, d9 denotes an on-axis thickness of the fifth lens, and TTL denotes a total optical length from an object side surface of the first lens to an image plane of the camera optical lens along an optic axis.

As an improvement, the camera optical lens further satisfies $FNO \leq 1.66$, where FNO denotes an F number of the camera optical lens.

As an improvement, the camera optical lens further satisfies $TTL/IH \leq 1.41$, where IH denotes an image height of the camera optical lens, and TTL denotes a total optical length from an object side surface of the first lens to an image plane of the camera optical lens along an optic axis.

As an improvement, the first lens is made of a glass material.

The present disclosure has the following beneficial effects. The camera optical lens according to the present disclosure can satisfy the design requirements for large-aperture, wide-angle, and ultra-thin while having high optical performance, especially suitable for camera lens assembly of mobile phones and WEB camera lenses formed by CCD, CMOS and other imaging elements for high pixels.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments.

To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
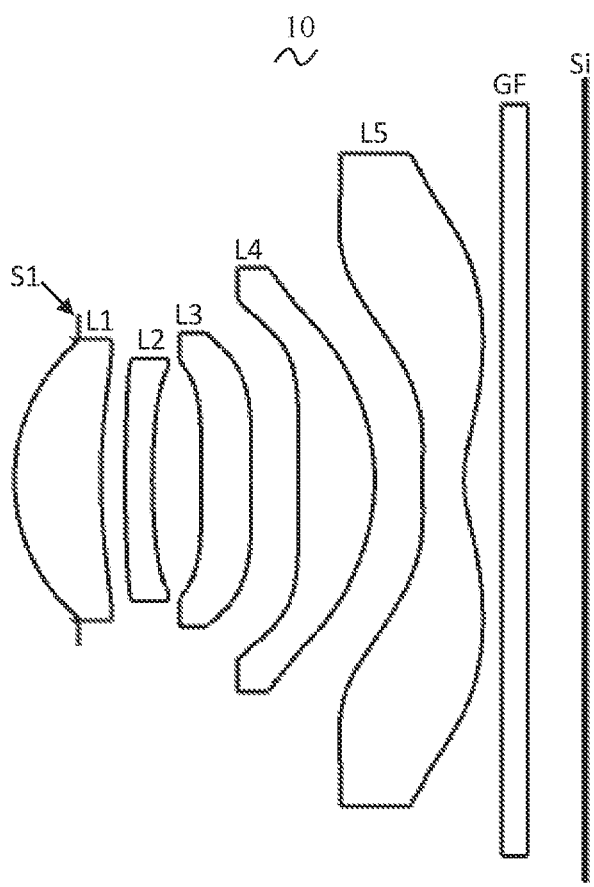
FIG. 1 is a schematic diagram of a structure of a camera optical lens according to Embodiment 1 of the present disclosure.

Referring to FIG. 1 to FIG. 4, the present disclosure provides a camera optical lens 10 according to the Embodiment 1. In FIG. 1, a left side is an object side, and a right side is an image side. The camera optical lens 10 mainly includes five lenses, i.e., from the object side to the image side, including an aperture S1, a first lens L1, a second lens L2, a third lens L3, a fourth lens L4, and a fifth lens L5. A glass filter (GF) is arranged between the fifth lens L5 and an image plane Si, and the glass filter (GF) can be a glass plate or an optical filter.

In the present embodiment, the first lens L1 is made of a glass material, the second lens L2 is made of a plastic material, the third lens L3 is made of a plastic material, the fourth lens L4 is made of a plastic material, and the fifth lens L5 is made of a plastic material. In other embodiments, the second lens L2, the third lens L3, the fourth lens L4, and the fifth lens L5 can also be made of other materials.

Here, a focal length of the camera optical lens 10 is defined as f, a focal length of the second lens L2 is defined as f2, and an abbe number of the first lens L1 is v1, which satisfy following conditions:

$$58.00 \leq v1 \leq 82.00 \quad (1), \text{ and}$$

$$-5.50 \leq f2/f \leq -3.50 \quad (2).$$

The condition (1) specifies the abbe number of the first lens, and within such a range, chromatic aberration of the system can be advantageously reduced, improving the imaging quality. The condition (2) specifies a ratio of the focal length of the second lens to the focal length of the camera optical lens 10, and within such a range, the performance of the system can be enhanced.

An on-axis distance from an image side surface of the third lens L3 to an object side surface of the fourth lens L4 is defined as d6, and an on-axis distance from an image side surface of the fourth lens L4 to an object side surface of the fifth lens L5 is defined as d8. The camera optical lens 10 should satisfy a condition of $0.80 \leq d6/d8 \leq 1.20$. When d6/d8 satisfies the condition, a position of the fourth lens can be distributed effectively, which is beneficial for correction of a field curvature.

A curvature radius of an object side surface of the fifth lens L5 is defined as R9, and a curvature radius of an image side surface of the fifth lens L5 is defined as R10. The camera optical lens 10 should satisfy a condition of $3.00 \leq R9/R10 \leq 6.00$, which specifies a shape of the fifth lens L5. This condition can alleviate the deflection of light passing through the lens while effectively reducing aberrations. As an example, $3.22 \leq R9/R10 \leq 5.95$.

In the present embodiment, the first lens L1 has a positive refractive power, and the first lens L1 includes an object side surface being convex in a paraxial region and an image side surface being concave in the paraxial region.

The focal length of the camera optical lens 10 is f, and a focal length of the first lens L1 is defined as f1. The camera optical lens 10 should satisfy a condition of $0.50 \leq f1/f \leq 1.61$, which specifies a ratio of the focal length f1 of the first lens L1 to the focal length f of the camera optical lens 10. When the condition is satisfied, the first lens L1 has an appropriate positive refractive power, thereby reducing aberrations of the system while being conducive to development towards ultra-thin and wide-angle lenses. As an example, $0.81 \leq f1/f \leq 1.29$.

A curvature radius of the object side surface of the first lens L1 is defined as R1, and a curvature radius of the image side surface of the first lens L1 is defined as R2. The camera optical lens 10 should satisfy a condition of $-4.22 \leq (R1+R2)/(R1-R2) \leq -1.27$. This can reasonably control a shape of the first lens L1 in such a manner that the first lens L1 can effectively correct spherical aberrations of the system. As an example, $-2.64 \leq (R1+R2)/(R1-R2) \leq -1.59$.

An on-axis thickness of the first lens L1 is defined as d1, and a total optical length from the object side surface of the first lens L1 to an image plane of the camera optical lens along an optic axis is defined as TTL. The camera optical lens 10 should satisfy a condition of $0.07 \leq d1/TTL \leq 0.23$. This condition can facilitate achieving ultra-thin lenses. As an example, $0.12 \leq d1/TTL \leq 0.19$.

In the present embodiment, the second lens L2 has a negative refractive power, and the second lens L2 includes an object side surface being convex in a paraxial region and an image side surface being concave in the paraxial region.

A curvature radius of the object side surface of the second lens L2 is defined as R3, and a curvature radius of the image side surface of the second lens L2 is defined as R4. The camera optical lens 10 should satisfy a condition of $1.20 \leq (R3+R4)/(R3-R4) \leq 11.57$, which specifies a shape of the second lens L2. This can facilitate correction of an on-axis aberration with development towards ultra-thin lenses. As an example, $1.91 \leq (R3+R4)/(R3-R4) \leq 9.26$.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of $0.02 \leq d3/TTL \leq 0.07$. This condition can facilitate achieving ultra-thin lenses. As an example, $0.04 \leq d3/TTL \leq 0.06$.

In the present embodiment, the third lens L3 has a negative refractive power, and it includes an object side surface being convex in a paraxial region and an image side surface being concave in the paraxial region.

The focal length of the camera optical lens 10 is defined as f, and a focal length of the third lens L3 is defined as f3. The camera optical lens 10 should satisfy a condition of $-140.37 \leq f3/f \leq 72.19$. Through reasonable distribution of the refractive power, the system can have a better imaging quality and a lower sensitivity. As an example, $-87.73 \leq f3/f \leq 57.75$.

A curvature radius of the object side surface of the third lens L3 is defined as R5, and a curvature radius of the image side surface of the third lens L3 is defined as R6. The camera optical lens 10 should satisfy a condition of $1.41 \leq (R5+R6)/(R5-R6) \leq 18.52$, which can effectively control a shape of the third lens L3, thereby facilitating shaping of the third lens L3. This condition can alleviate the deflection of light passing through the lens while effectively reducing aberrations. As an example, $2.25 \leq (R5+R6)/(R5-R6) \leq 14.82$.

An on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of $0.04 \leq d5/TTL \leq 0.16$, which is conducive to achieving ultra-thin lenses. As an example, $0.07 \leq d5/TTL \leq 0.13$.

In the present embodiment, the fourth lens L4 has a positive refractive power, and it includes an object side surface being convex in a paraxial region and an image side surface being convex in the paraxial region.

A focal length of the fourth lens L4 is f4, and the focal length of the camera optical lens 10 is f. The camera optical lens 10 further satisfies a condition of $0.43 \leq f4/f \leq 1.43$, which specifies a ratio of the focal length f4 of the fourth lens L4 to the focal length f of the system. Through reasonable distribution of the refractive power, the system can have a better image quality and a lower sensitivity. The condition facilitates improving the performance of the optical system. As an example, $0.69 \leq f4/f \leq 1.14$.

A curvature radius of the object side surface of the fourth lens L4 is defined as R7, and a curvature radius of the image side surface of the fourth lens L4 is defined as R8. The camera optical lens 10 should satisfy a condition of $0.33 \leq (R7+R8)/(R7-R8) \leq 1.48$, which specifies a shape of the fourth lens L4. This can facilitate correction of an off-axis aberration with development towards ultra-thin and wide-angle lenses. As an example, $0.53 \leq (R7+R8)/(R7-R8) \leq 1.18$.

An on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of $0.06 \leq d7/TTL \leq 0.20$, which can facilitate achieving ultra-thin lenses. As an example, $0.09 \leq d7/TTL \leq 0.16$.

In the present embodiment, the fifth lens L5 has a negative refractive power, and it includes an object side surface being convex in a paraxial region and an image side surface being concave in the paraxial region.

A focal length of the fifth lens L5 is f5, and the focal length of the camera optical lens 10 is f. The camera optical lens 10 further satisfies a condition of $-1.46 \leq f5/f \leq -0.45$. The fifth lens L5 is limited to effectively make a light angle of the camera optical lens 10 gentle and reduce the tolerance sensitivity. As an example, $-0.91 \leq f5/f \leq -0.56$.

A curvature radius of the object side surface of the fifth lens L5 is defined as R9, and a curvature radius of the image side surface of the fifth lens L5 is defined as R10. The camera optical lens 10 should satisfy a condition of $0.70 \leq (R9+R10)/(R9-R10) \leq 2.73$, which specifies a shape of the fifth lens L5. This can facilitate correction of an off-axis aberration with development towards ultra-thin, wide-angle lenses. As an example, $1.13 \leq (R9+R10)/(R9-R10) \leq 2.19$.

An on-axis thickness of the fifth lens L5 is defined as d9, and the total optical length from the object side surface of the first lens L1 to an image plane of the camera optical lens 10 along an optic axis is defined as TTL. The camera optical lens 10 should satisfy a condition of $0.03 \leq d9/TTL \leq 0.11$. This can facilitate achieving ultra-thin lenses. As an example, $0.06 \leq d9/TTL \leq 0.09$.

In the present embodiment, an F number FNO of the camera optical lens 10 is smaller than or equal to 1.66, thereby leading to a large aperture.

In the present embodiment, an image height of the camera optical lens 10 is defined as IH, and the total optical length from the object side surface of the first lens L1 to an image plane of the camera optical lens along an optic axis is defined as TTL. The camera optical lens 10 should satisfy a condition of $TTL/IH \leq 1.41$. This condition can facilitate achieving ultra-thin lenses.

In the present embodiment, the focal length of the camera optical lens 10 is defined as f, and a combined focal length of the first lens L1 and the second lens L2 is defined as f12. The camera optical lens 10 should satisfy a condition of $0.61 \leq f12/f \leq 1.92$. This can eliminate the aberration and distortion of the camera optical lens 10, suppress the back focal length of the camera optical lens 10, and maintain miniaturization of the camera lens system group. As an example, $0.98 \leq f12/f \leq 1.54$.

In addition, in the camera optical lens 10 provided by the present embodiment, the surface of each lens is an aspherical surface, which is easy to be made into a shape other than a spherical surface, to obtain more control variables for reducing aberrations, thereby reducing a number of the required lenses. In this way, the total length of the camera optical lens 10 can be effectively reduced. In the present embodiment, the object side surface and the image side surface of each lens are all aspherical surfaces.

Since the first lens L1, the second lens L2, the third lens L3, the fourth lens L4, and the fifth lens L5 have the structure and satisfy parameter relationship as described above, the camera optical lens 10 can reasonably allocate the refractive power, spacing and shape of each lens, and thus can correct various aberrations.

Thus, the camera optical lens 10 can further satisfy design requirements for ultra-thin, large aperture, and wide-angle lenses while having high optical performance.

Examples of the camera optical lens 10 of the present disclosure are described below. The symbols recorded in each example will be described as follows. The focal length, on-axis distance, curvature radius, on-axis thickness, inflexion point position, and arrest point position are all in units of mm.

TTL: total optical length (on-axis distance from the object side surface of the first lens L1 to the image plane Si of the camera optical lens along the optic axis) in mm.

F number (FNO): a ratio of an effective focal length of the camera optical lens to an entrance pupil diameter of the camera optical lens.

In addition, inflexion points and/or arrest points can be arranged on at least one of the object side surface and the image side surface of each lens, so as to satisfy the demand for the high quality imaging. The specific implementations can be referred to the description below.

The design data of the camera optical lens 10 shown in FIG. 1 is listed below.

Table 1 includes the curvature radius of the object side surface and the curvature radius R of the image side surface of each of the first lens L1 to the fifth lens L5, which constitute the camera optical lens 10 in the Embodiment 1 of the present disclosure, the on-axis thickness of each lens, the distance d between adjacent lenses, refractive index nd and abbe number vd. It should be noted that R and d are both in units of millimeter (mm).

TABLE 1

|  | R |  | d | nd |  | vd |
|---|---|---|---|---|---|---|
| S1 | ∞ | d0= | −0.512 |  |  |  |
| R1 | 1.496 | d1= | 0.694 | nd1 | 1.5357 v1 | 74.64 |
| R2 | 4.481 | d2= | 0.192 |  |  |  |
| R3 | 7.019 | d3= | 0.220 | nd2 | 1.6700 v2 | 19.39 |
| R4 | 4.174 | d4= | 0.395 |  |  |  |
| R5 | 159.315 | d5= | 0.400 | nd3 | 1.5444 v3 | 55.82 |
| R6 | 75.742 | d6= | 0.380 |  |  |  |
| R7 | 232.500 | d7= | 0.609 | nd4 | 1.5444 v4 | 55.82 |
| R8 | −1.792 | d8= | 0.384 |  |  |  |
| R9 | 4.771 | d9= | 0.334 | nd5 | 1.5438 v5 | 56.03 |
| R10 | 1.043 | d10= | 0.300 |  |  |  |
| R11 | ∞ | d11= | 0.210 | ndg | 1.5168 vg | 64.17 |
| R12 | ∞ | d12= | 0.472 |  |  |  |

In the above table, meanings of various symbols will be described as follows.

S1: aperture,

R: curvature radius at center an optical surface,

R1: curvature radius of the object side surface of the first lens L1,

R2: curvature radius of the image side surface of the first lens L1,

R3: curvature radius of the object side surface of the second lens L2,

R4: curvature radius of the image side surface of the second lens L2,

R5: curvature radius of the object side surface of the third lens L3,

R6: curvature radius of the image side surface of the third lens L3,

R7: curvature radius of the object side surface of the fourth lens L4,

R8: curvature radius of the image side surface of the fourth lens L4,

R9: curvature radius of the object side surface of the fifth lens L5,

R10: curvature radius of the image side surface of the fifth lens L5,

R11: curvature radius of an object side surface of the optical filter GF,

R12: curvature radius of an image side surface of the optical filter GF, d: on-axis thickness of a lens and an on-axis distance between lenses, d0: on-axis distance from the aperture S1 to the object side surface of the first lens L1, d1: on-axis thickness of the first lens L1, d2: on-axis distance from the image side surface of the first lens L1 to the object side surface of the second lens L2, d3: on-axis thickness of the second lens L2, d4: on-axis distance from the image side surface of the second lens L2 to the object side surface of the third lens L3, d5: on-axis thickness of the third lens L3, d6: on-axis distance from the image side surface of the third lens L3 to the object side surface of the fourth lens L4, d7: on-axis thickness of the fourth lens L4, d8: on-axis distance from the image side surface of the fourth lens L4 to the object side surface of the fifth lens L5, d9: on-axis thickness of the fifth lens L5, d10: on-axis distance from the image side surface of the fifth lens L5 to the object side surface of the optical filter GF, d11: on-axis thickness of the optical filter GF, d12: on-axis distance from the image side surface of the optical filter GF to the image plane, nd: refractive index of d line, nd1: refractive index of d line of the first lens L1, nd2: refractive index of d line of the second lens L2, nd3: refractive index of d line of the third lens L3, nd4: refractive index of d line of the fourth lens L4, nd5: refractive index of d line of the fifth lens L5, ndg: refractive index of d line of the optical filter GF, vd: abbe number, v1: abbe number of the first lens L1, v2: abbe number of the second lens L2, v3: abbe number of the third lens L3, v4: abbe number of the fourth lens L4, v5: abbe number of the fifth lens L5, vg: abbe number of the optical filter GF.

Table 2 includes aspheric surface data of respective lens in the camera optical lens 10 according to Embodiment 1 of the present disclosure.

TABLE 2

|  | Conic coefficient | Aspherical surface coefficients | | | | |
|---|---|---|---|---|---|---|
|  | k | A4 | A6 | A8 | A10 | A12 |
| R1 | 8.0037E−02 | −1.0442E−02 | 5.8243E−02 | −2.5272E−01 | 6.8558E−01 | −1.1905E+00 |
| R2 | −2.1501E+01 | 2.2926E−03 | −1.4434E−01 | 8.6921E−01 | −2.9904E+00 | 6.2752E+00 |
| R3 | 2.6177E+01 | −1.2679E−01 | 2.3162E−01 | −8.9274E−01 | 3.3422E+00 | −7.7215E+00 |
| R4 | 1.1628E+01 | −9.6267E−02 | 2.0826E−01 | −7.5839E−01 | 3.4496E+00 | −9.6072E+00 |
| R5 | 2.3207E+01 | −1.7233E−01 | −6.7851E−02 | 9.2578E−01 | −5.3816E+00 | 1.6685E+01 |
| R6 | 3.7527E+01 | −1.4241E−01 | −5.8507E−02 | 2.0774E−01 | −6.3300E−01 | 1.1199E+00 |
| R7 | −9.9000E+01 | −4.0803E−02 | 2.8558E−02 | −2.6860E−01 | 5.8009E−01 | −7.4604E−01 |
| R8 | −2.0145E+00 | −7.9817E−02 | 2.2656E−01 | −5.0343E−01 | 7.1475E−01 | −6.5173E−01 |
| R9 | −3.9781E+02 | −5.7019E−01 | 6.1838E−01 | −4.3949E−01 | 2.0925E−01 | −6.4611E−02 |
| R10 | −8.5762E+00 | −2.2063E−01 | 2.0292E−01 | −1.2464E−01 | 5.0431E−02 | −1.3508E−02 |

TABLE 2-continued

| | Conic coefficient | Aspherical surface coefficients | | | |
|---|---|---|---|---|---|
| | k | A14 | A16 | A18 | A20 |
| R1 | 8.0037E−02 | 1.3220E+00 | −9.1118E−01 | 3.5558E−01 | −6.0603E−02 |
| R2 | −2.1501E+01 | −8.1634E+00 | 6.4131E+00 | −2.7876E+00 | 5.1424E−01 |
| R3 | 2.6177E+01 | 1.1066E+01 | −9.6594E+00 | 4.7071E+00 | −9.8081E−01 |
| R4 | 1.1628E+01 | 1.6685E+01 | −1.7573E+01 | 1.0232E+01 | −2.4950E+00 |
| R5 | 2.3207E+01 | −3.0726E+01 | 3.3303E+01 | −1.9643E+01 | 4.8613E+00 |
| R6 | 3.7527E+01 | −1.2925E+00 | 9.6471E−01 | −4.2438E−01 | 8.3244E−02 |
| R7 | −9.9000E+01 | 5.5464E−01 | −2.3680E−01 | 5.4958E−02 | −5.4147E−03 |
| R8 | −2.0145E+00 | 3.6156E−01 | −1.1613E−01 | 1.9796E−02 | −1.3858E−03 |
| R9 | −3.9781E+02 | 1.2740E−02 | −1.5508E−03 | 1.0637E−04 | −3.1490E−06 |
| R10 | −8.5762E+00 | 2.3387E−03 | −2.4885E−04 | 1.4705E−05 | −3.6825E−07 |

In Table 2, k is a conic coefficient, and A4, A6, A8, A10, A12, A14, A16, A18, and A20 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (3),$$

where x is a vertical distance between a point on an aspherical curve and the optic axis, and y is an aspherical depth (a vertical distance between a point on an aspherical surface having a distance x from the optic axis and a surface tangent to a vertex of the aspherical surface on the optic axis).

In the present embodiment, an aspheric surface of each lens surface uses the aspheric surface expressed by the above condition (3). However, the present disclosure is not limited to the aspherical polynomial form expressed by the condition (3).

Table 3 and Table 4 show design data of inflexion points and arrest points of respective lens in the camera optical lens 10 of the present embodiment. P1R1 and P1R2 represent the object side surface and the image side surface of the first lens L1, respectively, P2R1 and P2R2 represent the object side surface and the image side surface of the second lens L2, respectively, P3R1 and P3R2 represent the object side surface and the image side surface of the third lens L3, respectively, P4R1 and P4R2 represent the object side surface and the image side surface of the fourth lens L4, respectively, and P5R1 and P5R2 represent the object side surface and the image side surface of the fifth lens L5, respectively. The data in the column "inflexion point position" refers to vertical distances from inflexion points arranged on each lens surface to the optic axis of the camera optical lens 10. The data in the column "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 0 | / | / | / |
| P1R2 | 1 | 0.805 | / | / |
| P2R1 | 2 | 0.465 | 0.495 | / |
| P2R2 | 0 | / | / | / |
| P3R1 | 1 | 0.055 | / | / |
| P3R2 | 2 | 0.095 | 1.145 | / |
| P4R1 | 2 | 0.095 | 1.335 | / |
| P4R2 | 3 | 1.325 | 1.585 | 1.695 |
| P5R1 | 3 | 0.145 | 1.285 | 2.405 |
| P5R2 | 3 | 0.415 | 2.185 | 2.495 |

TABLE 4

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 1 | 0.095 | / |
| P3R2 | 1 | 0.155 | / |
| P4R1 | 1 | 0.165 | / |
| P4R2 | 0 | / | / |
| P5R1 | 2 | 0.265 | 2.085 |
| P5R2 | 1 | 1.125 | / |

Further, Table 13 below includes the parameters of Embodiments 1, 2 and 3 and parameters which are specified in the above conditions.

As reflected in Table 3, Embodiment 1 satisfies the various conditions.

Figure 2:
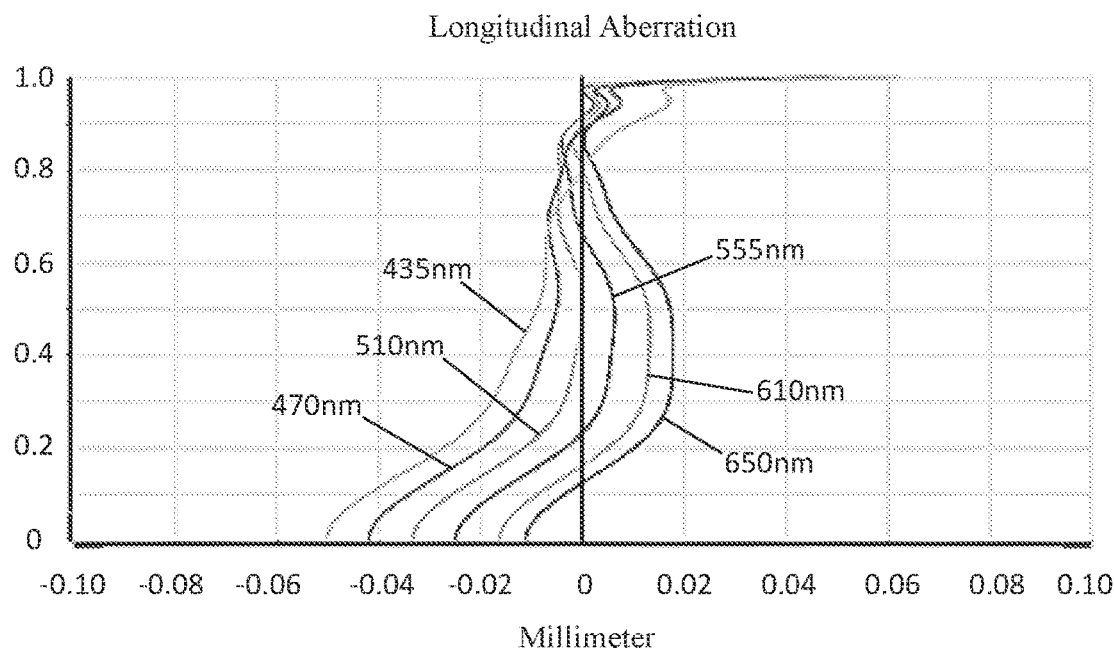
FIG. 2 is a schematic diagram of a longitudinal aberration of the camera optical lens shown in FIG. 1.
Figure 3:
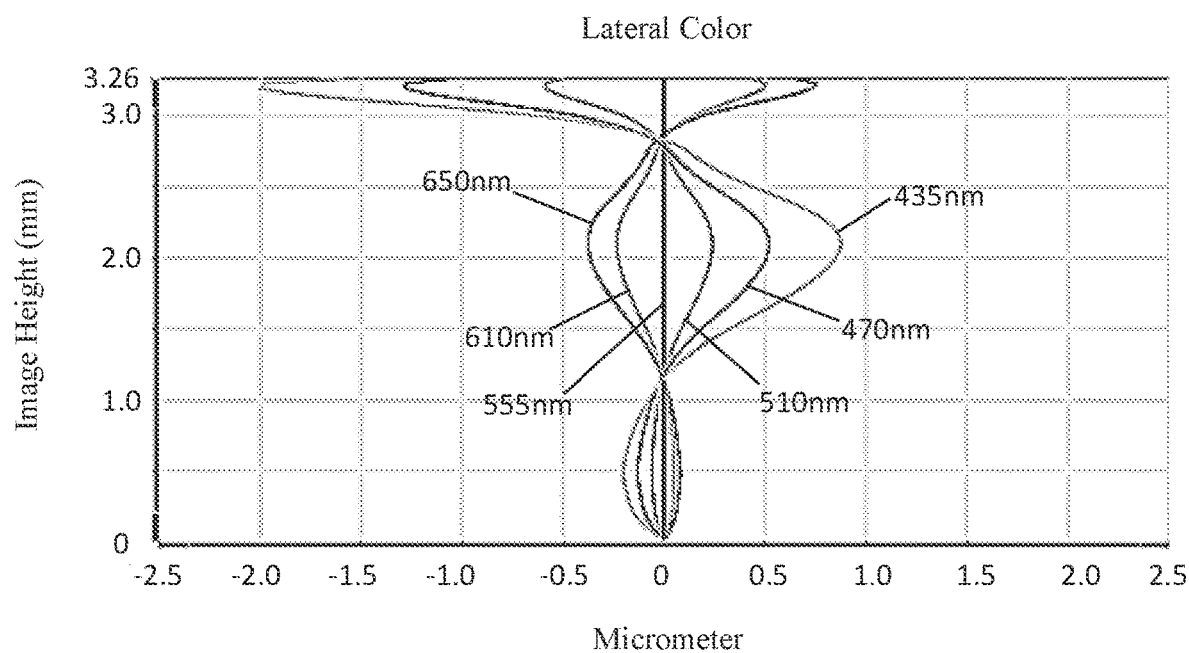
FIG. 3 is a schematic diagram of a lateral color of the camera optical lens shown in FIG. 1.
Figure 4:
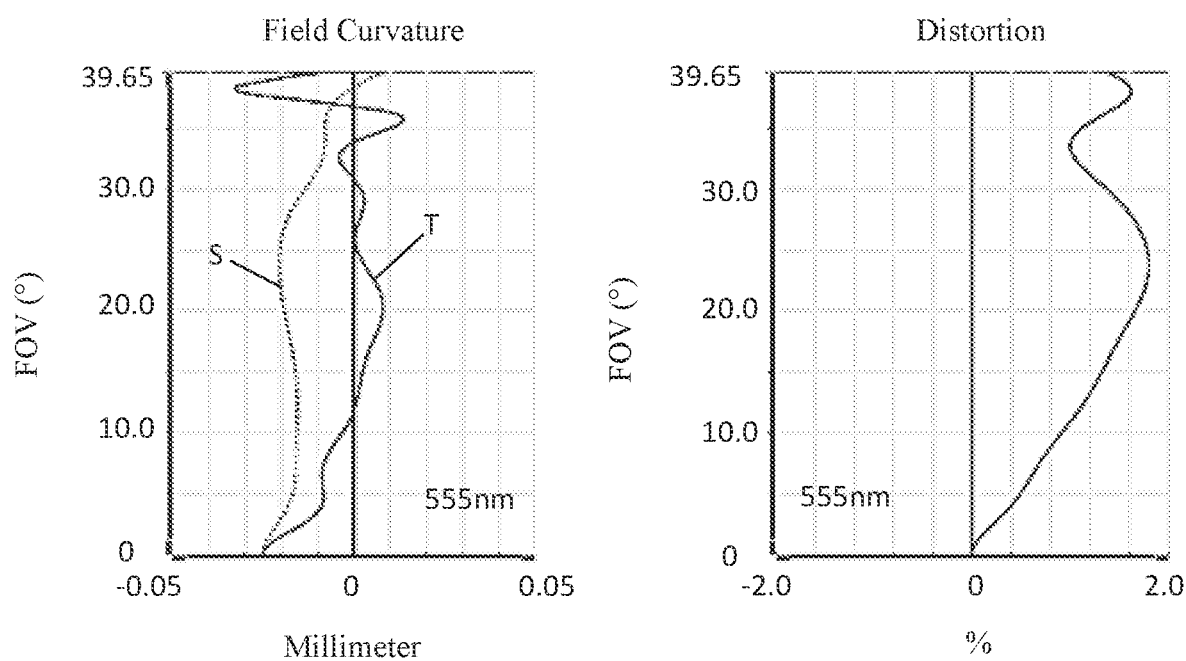
FIG. 4 is a schematic diagram of a field curvature and a distortion of the camera optical lens shown in FIG. 1.

FIG. 2 and FIG. 3 respectively illustrate a longitudinal aberration and a lateral color of light with wavelengths of 650 nm, 610 nm, 555 nm, 510 nm, 470 nm and 435 nm after passing the camera optical lens 10. FIG. 4 illustrates a field curvature and a distortion of light with a wavelength of 555 nm after passing the camera optical lens 10, in which a field curvature S is a field curvature in a sagittal direction, and T is a field curvature in a tangential direction.

In the present embodiment, the entrance pupil diameter ENPD of the camera optical lens 10 is 2.284 mm, timage height IH is 3.259 mm, the FOV (field of view) along a diagonal direction is 79.30°, such that the camera optical lens 10 can satisfy design requirements for ultra-thin, large-aperture and wide-angle while on-axis and off-axis aberrations are sufficiently corrected, thereby leading to better optical characteristics.

Embodiment 2

Figure 5:
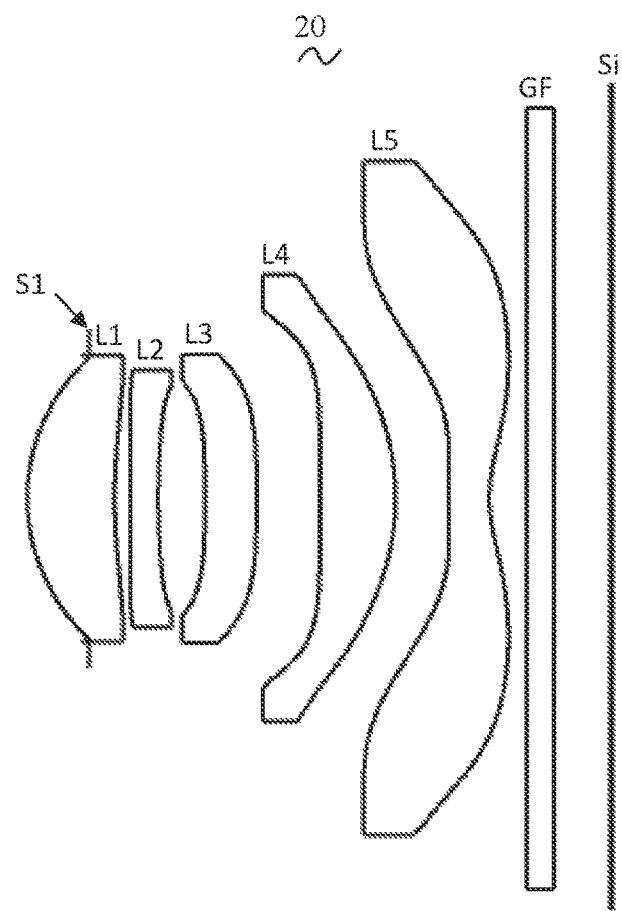
FIG. 5 is a schematic diagram of a structure of a camera optical lens according to Embodiment 2.

FIG. 5 is a structural schematic diagram of a camera optical lens 20 in Embodiment 2. Embodiment 2 is basically the same as Embodiment 1 and involves symbols having the same meanings as Embodiment 1, which will not be repeated herein. Only differences therebetween will be described in the following.

In the present disclosure, the third lens L3 has a positive refractive power, and it includes an object side surface being concave in a paraxial region and an image side surface being convex in the paraxial region.

Table 5 and Table 6 show design data of a camera optical lens 20 in Embodiment 2 of the present disclosure.

TABLE 5

| | R | | d | nd | | vd | |
|---|---|---|---|---|---|---|---|
| S1 | ∞ | d0= | −0.485 | | | | |
| R1 | 1.544 | d1= | 0.682 | nd1 | 1.5831 | v1 | 59.46 |
| R2 | 4.331 | d2= | 0.121 | | | | |
| R3 | 12.636 | d3= | 0.220 | nd2 | 1.6700 | v2 | 19.39 |
| R4 | 5.185 | d4= | 0.368 | | | | |
| R5 | −26.947 | d5= | 0.406 | nd3 | 1.5444 | v3 | 55.82 |
| R6 | −18.124 | d6= | 0.497 | | | | |
| R7 | 173.456 | d7= | 0.592 | nd4 | 1.5444 | v4 | 55.82 |
| R8 | −1.945 | d8= | 0.416 | | | | |
| R9 | 3.444 | d9= | 0.320 | nd5 | 1.5438 | v5 | 56.03 |
| R10 | 1.003 | d10= | 0.300 | | | | |
| R11 | ∞ | d11= | 0.210 | ndg | 1.5168 | vg | 64.17 |
| R12 | ∞ | d12= | 0.458 | | | | |

Table 6 shows aspheric surface data of respective lenses in the camera optical lens 20 according to Embodiment 2 of the present disclosure.

TABLE 6

| | Conic coefficient | Aspherical surface coefficients | | | | |
|---|---|---|---|---|---|---|
| | k | A4 | A6 | A8 | A10 | A12 |
| R1 | 1.1945E−01 | −6.5110E−03 | 5.0076E−02 | −2.0628E−01 | 5.2881E−01 | −8.3294E−01 |
| R2 | −3.6599E+01 | −1.4982E−02 | −6.6873E−02 | 3.1250E−01 | −8.1340E−01 | 1.4072E+00 |
| R3 | 7.9790E+01 | −1.5350E−01 | 1.3848E−01 | 1.2029E−01 | −1.9373E−01 | −2.2946E−01 |
| R4 | 1.6257E+01 | −9.3949E−02 | 1.3259E−01 | 1.0929E−01 | 1.9958E−01 | −9.4022E−01 |
| R5 | −9.8978E+01 | −1.9464E−01 | 1.9099E−01 | −1.1836E+00 | 3.9377E+00 | −8.0755E+00 |
| R6 | −2.3567E+01 | −1.2892E−01 | −1.0355E−01 | 5.4303E−01 | −1.8634E+00 | 3.7580E+00 |
| R7 | −4.9524E+01 | −1.8781E−02 | −5.4631E−02 | 3.6393E−02 | −1.5257E−03 | −4.5421E−02 |
| R8 | −2.2542E+00 | −6.0045E−02 | 1.2064E−01 | −2.4205E−01 | 3.2667E−01 | −2.7577E−01 |
| R9 | −1.4956E+02 | −5.2793E−01 | 4.6935E−01 | −2.5469E−01 | 9.3600E−02 | −2.2966E−02 |
| R10 | −7.9843E+00 | −2.1485E−01 | 1.6731E−01 | −8.5977E−02 | 2.9225E−02 | −6.5650E−03 |

| | Conic coefficient | Aspherical surface coefficients | | | |
|---|---|---|---|---|---|
| | k | A14 | A16 | A18 | A20 |
| R1 | 1.1945E−01 | 8.2698E−01 | −5.1375E−01 | 1.8687E−01 | −3.1993E−02 |
| R2 | −3.6599E+01 | −1.5698E+00 | 1.0474E+00 | −3.7853E−01 | 5.6826E−02 |
| R3 | 7.9790E+01 | 7.9590E−01 | −8.5702E−01 | 4.3924E−01 | −8.6579E−02 |
| R4 | 1.6257E+01 | 1.8002E+00 | −1.1909E+00 | −6.0132E−02 | 3.0017E−01 |
| R5 | −9.8978E+01 | 9.3788E+00 | −5.3461E+00 | 5.3442E−01 | 5.1735E−01 |
| R6 | −2.3567E+01 | −4.7009E+00 | 3.5917E+00 | −1.5465E+00 | 2.9093E−01 |
| R7 | −4.9524E+01 | 4.4678E−02 | −1.9861E−02 | 4.3813E−03 | −3.5310E−04 |
| R8 | −2.2542E+00 | 1.3969E−01 | −4.0848E−02 | 6.3414E−03 | −4.0437E−04 |
| R9 | −1.4956E+02 | 3.6667E−03 | −3.6407E−04 | 2.0339E−05 | −4.8609E−07 |
| R10 | −7.9843E+00 | 9.3348E−04 | −7.7768E−05 | 3.2763E−06 | −4.7252E−08 |

Table 7 and Table 8 show design data of inflexion points and arrest points of respective lens in the camera optical lens 20.

TABLE 7

| | Number of inflexion points | Inflexion point position 1 | Inflexion point position 2 | Inflexion point position 3 |
|---|---|---|---|---|
| P1R1 | 1 | 1.105 | / | / |
| P1R2 | 1 | 0.715 | / | / |
| P2R1 | 2 | 0.235 | 0.595 | / |
| P2R2 | 0 | / | / | / |
| P3R1 | 0 | / | / | / |
| P3R2 | 1 | 1.075 | / | / |
| P4R1 | 2 | 0.155 | 1.415 | / |
| P4R2 | 2 | 1.385 | 1.625 | / |
| P5R1 | 2 | 0.175 | 1.265 | / |
| P5R2 | 3 | 0.415 | 2.335 | 2.485 |

TABLE 8

| | Number of arrest points | Arrest point position 1 | Arrest point position 2 |
|---|---|---|---|
| P1R1 | 0 | / | / |
| P1R2 | 0 | / | / |
| P2R1 | 2 | 0.435 | 0.705 |
| P2R2 | 0 | / | / |
| P3R1 | 0 | / | / |
| P3R2 | 0 | / | / |
| P4R1 | 1 | 0.245 | / |
| P4R2 | 0 | / | / |
| P5R1 | 2 | 0.325 | 2.275 |
| P5R2 | 1 | 1.085 | / |

Table 13 below further parameters of Embodiment 2 and parameters which are specified in the above conditions. Obviously, the camera optical lens of the present embodiment satisfies the various conditions.

Figure 6:
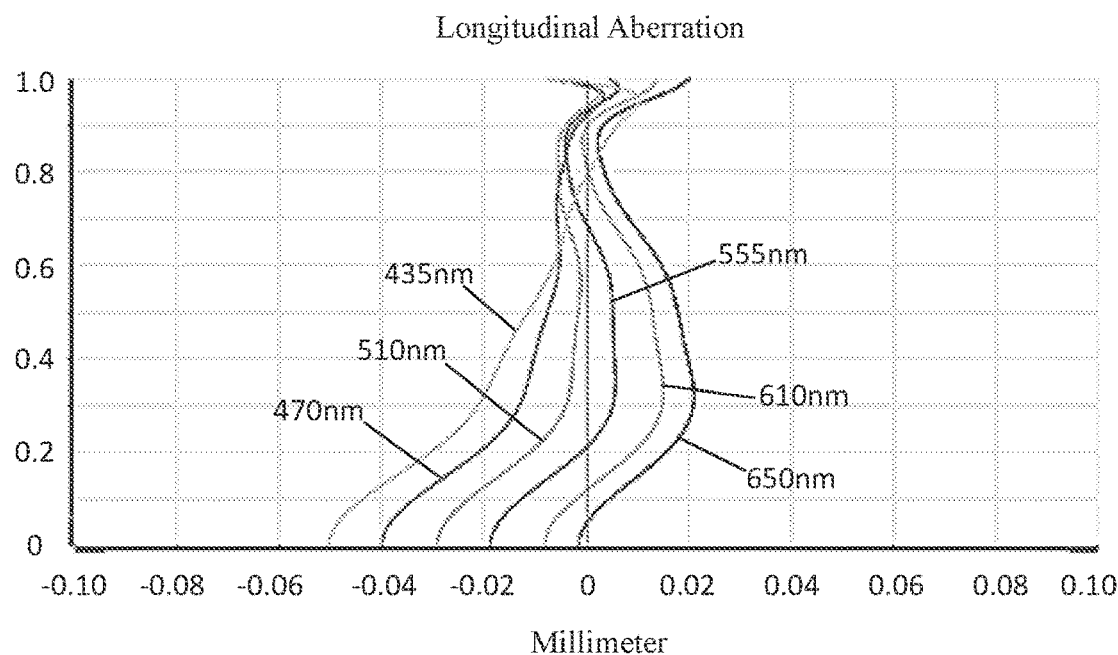
FIG. 6 is a schematic diagram of a longitudinal aberration of the camera optical lens shown in FIG. 5.
Figure 7:
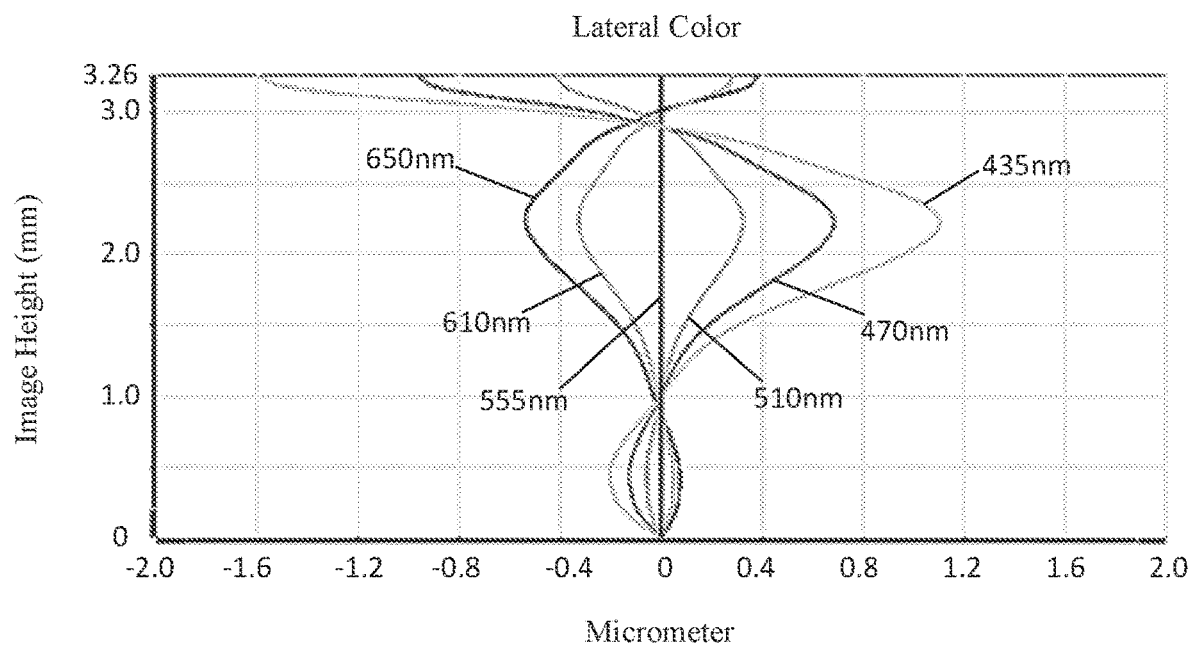
FIG. 7 is a schematic diagram of a lateral color of the camera optical lens shown in FIG. 5.
Figure 8:
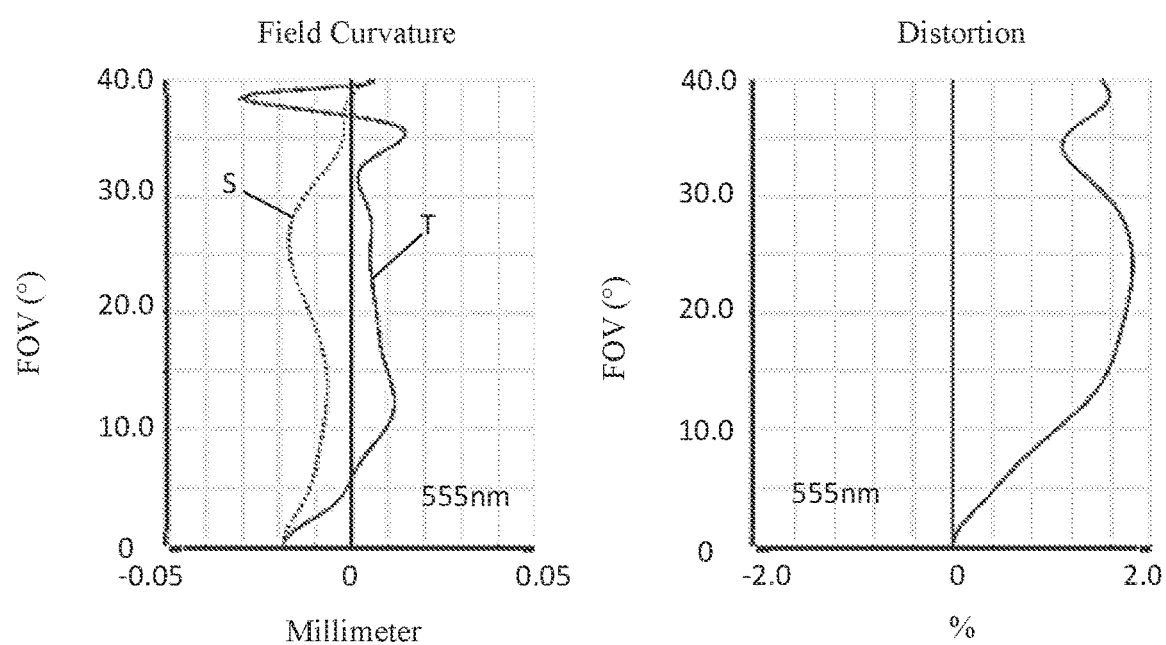
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm, 470 nm, and 435 nm after passing the camera optical lens 20. FIG. 8 illustrates a field curvature and a distortion of light with a wavelength of 555 nm after passing the camera optical lens 20, in which a field curvature S is a field curvature in a sagittal direction, and T is a field curvature in a tangential direction.

In the present embodiment, the entrance pupil diameter ENPD of the camera optical lens 20 is 2.260 mm, the image height IH is 3.259 mm, the FOV (field of view) along a diagonal direction is 80.00°, such that the camera optical lens 20 can satisfy design requirements of ultra-thin, large-aperture and wide-angle while on-axis and off-axis aberrations are sufficiently corrected, thereby leading to better optical characteristics.

Embodiment 3

Figure 9:
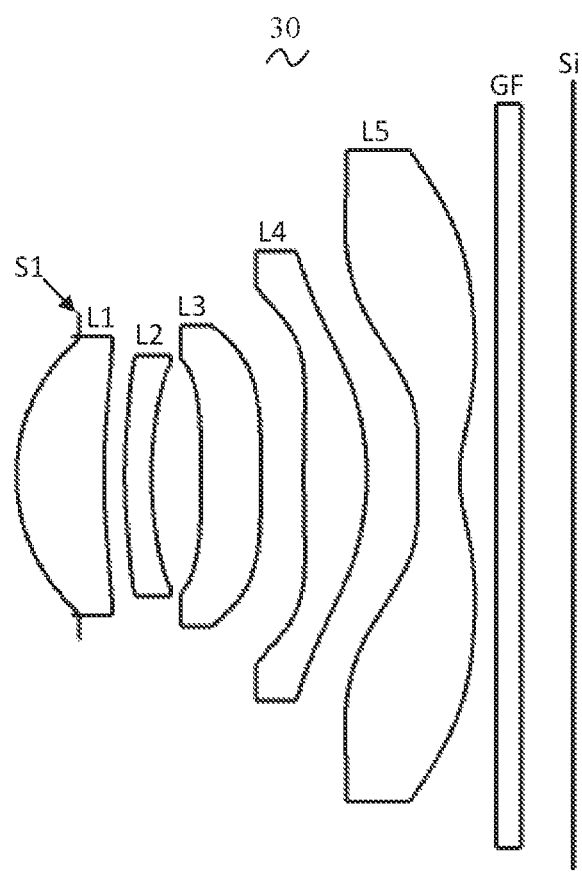
FIG. 9 is a schematic diagram of a structure of a camera optical lens according to Embodiment 3.

FIG. 9 is a structural schematic diagram of a camera optical lens 30 in Embodiment 3. Embodiment 3 is basically the same as Embodiment 1 and involves symbols having the same meanings as Embodiment 1, and the same portions will not be repeated. Only differences therebetween will be described in the following.

In the present embodiment, the third lens L3 has a positive refractive power, and it includes an object side surface being concave in a paraxial region and an image side surface being convex in the paraxial region.

Table 9 and Table 10 show design data of a camera optical lens 30 in Embodiment 3 of the present disclosure.

TABLE 9

| | R | d | | nd | | vd |
|---|---|---|---|---|---|---|
| S1 | ∞ | d0= | −0.516 | | | |
| R1 | 1.496 | d1= | 0.719 | nd1 | 1.4970 v1 | 81.60 |

TABLE 9-continued

| | R | d | | nd | | vd |
|---|---|---|---|---|---|---|
| R2 | 4.778 | d2= | 0.173 | | | |
| R3 | 3.700 | d3= | 0.220 | nd2 | 1.6700 v2 | 19.39 |
| R4 | 2.851 | d4= | 0.408 | | | |
| R5 | −18.695 | d5= | 0.496 | nd3 | 1.5444 v3 | 55.82 |
| R6 | −15.894 | d6= | 0.350 | | | |
| R7 | 11.614 | d7= | 0.518 | nd4 | 1.5444 v4 | 55.82 |
| R8 | −2.339 | d8= | 0.422 | | | |
| R9 | 6.652 | d9= | 0.344 | nd5 | 1.5438 v5 | 56.03 |
| R10 | 1.126 | d10= | 0.300 | | | |
| R11 | ∞ | d11= | 0.210 | ndg | 1.5168 vg | 64.17 |
| R12 | ∞ | d12= | 0.431 | | | |

Table 10 shows aspheric surface data of respective lenses in the camera optical lens 30 according to Embodiment 3 of the present disclosure.

TABLE 10

| | Conic coefficient | Aspherical surface coefficients | | | | |
|---|---|---|---|---|---|---|
| | k | A4 | A6 | A8 | A10 | A12 |
| R1 | 6.5828E−02 | −1.4520E−02 | 8.0835E−02 | −3.6270E−01 | 9.8185E−01 | −1.6714E+00 |
| R2 | −3.1790E+01 | −1.3226E−02 | −8.7749E−02 | 4.9908E−01 | −1.5162E+00 | 2.8401E+00 |
| R3 | 2.9163E+00 | −1.4185E−01 | 1.1877E−01 | −4.1810E−01 | 1.7955E+00 | −4.2373E+00 |
| R4 | 5.6403E+00 | −1.1030E−01 | 6.0684E−02 | −1.3255E−01 | 8.2116E−01 | −2.2705E+00 |
| R5 | −9.8897E+01 | −9.3058E−02 | −3.4349E−01 | 2.4578E+00 | −1.0851E+01 | 2.8849E+01 |
| R6 | −9.7467E+01 | −1.0324E−01 | −7.1821E−02 | 8.0971E−02 | 5.4062E−02 | −4.4563E−01 |
| R7 | 5.0790E+01 | −1.7037E−02 | −1.0946E−01 | 1.2179E−01 | −1.1811E−01 | 8.1085E−02 |
| R8 | −3.0567E+00 | −4.6045E−02 | 1.8140E−02 | −3.8534E−02 | 6.4101E−02 | −4.4552E−02 |
| R9 | −4.0000E+02 | −5.9410E−01 | 4.8210E−01 | −2.0148E−01 | 5.2660E−02 | −9.0639E−03 |
| R10 | −8.7072E+00 | −2.2914E−01 | 1.7435E−01 | −8.2256E−02 | 2.6280E−02 | −5.8814E−03 |

| | Conic coefficient | Aspherical surface coefficients | | | |
|---|---|---|---|---|---|
| | k | A14 | A16 | A18 | A20 |
| R1 | 6.5828E−02 | 1.7971E+00 | −1.1888E+00 | 4.4208E−01 | −7.1159E−02 |
| R2 | −3.1790E+01 | −3.3334E+00 | 2.3770E+00 | −9.4053E−01 | 1.5780E−01 |
| R3 | 2.9163E+00 | 6.0291E+00 | −5.1939E+00 | 2.5036E+00 | −5.1857E−01 |
| R4 | 5.6403E+00 | 3.8249E+00 | −4.0126E+00 | 2.3817E+00 | −5.9053E−01 |
| R5 | −9.8897E+01 | −4.7240E+01 | 4.6361E+01 | −2.4999E+01 | 5.6952E+00 |
| R6 | −9.7467E+01 | 7.3044E−01 | −5.8076E−01 | 2.3118E−01 | −3.6360E−02 |
| R7 | 5.0790E+01 | −4.0993E−02 | 1.3193E−02 | −1.8932E−03 | 3.3734E−05 |
| R8 | −3.0567E+00 | 1.6415E−02 | −3.4479E−03 | 3.9835E−04 | −2.0163E−05 |
| R9 | −4.0000E+02 | 1.0320E−03 | −7.5502E−05 | 3.2841E−06 | −6.7430E−08 |
| R10 | −8.7072E+00 | 9.0293E−04 | −8.9712E−05 | 5.1639E−06 | −1.3043E−07 |

Table 11 and Table 12 show design data of inflexion points and arrest points of respective lens in the camera optical lens 30.

TABLE 11

| | Number of inflexion points | Inflexion point position 1 | Inflexion point position 2 | Inflexion point position 3 |
|---|---|---|---|---|
| P1R1 | 0 | / | / | / |
| P1R2 | 1 | 0.735 | / | / |
| P2R1 | 0 | / | / | / |
| P2R2 | 0 | / | / | / |
| P3R1 | 0 | / | / | / |
| P3R2 | 1 | 1.215 | / | / |
| P4R1 | 2 | 0.405 | 1.405 | / |
| P4R2 | 2 | 1.145 | 1.785 | / |
| P5R1 | 3 | 0.135 | 1.065 | 2.375 |
| P5R2 | 1 | 0.405 | / | / |

TABLE 12

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 1 | 0.635 | / |
| P4R2 | 0 | / | / |
| P5R1 | 2 | 0.235 | 2.095 |
| P5R2 | 1 | 1.025 | / |

Further, Table 13 below includes parameters of Embodiment 3 and parameters which are specified in the above conditions. Obviously, the camera optical lens of the present embodiment satisfies the various conditions.

Figure 10:
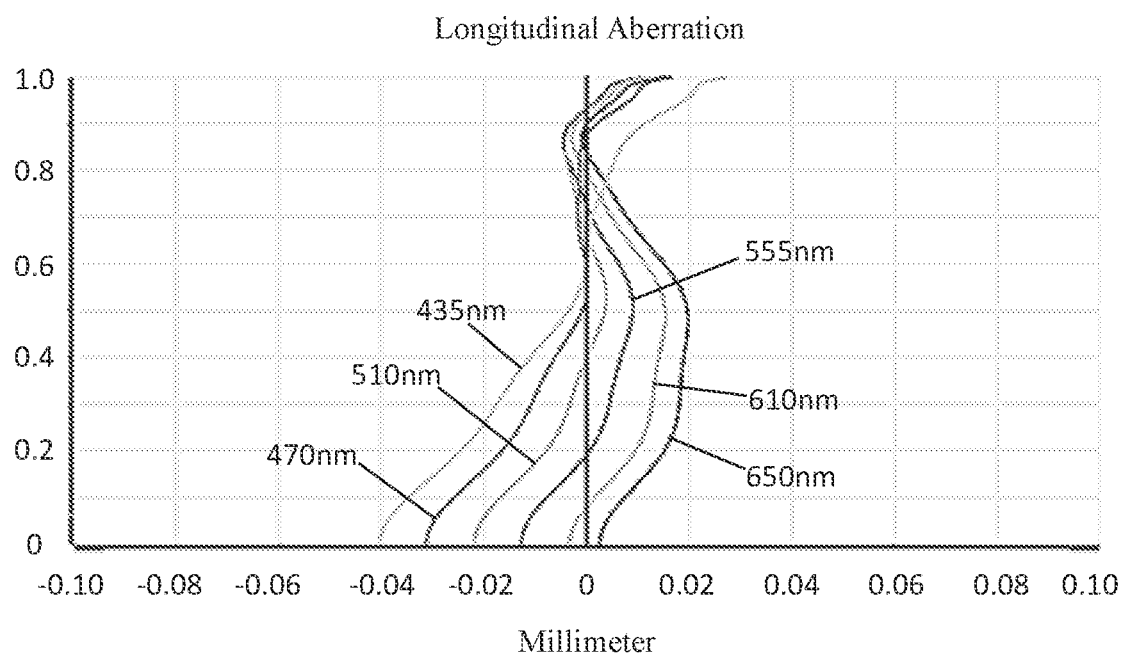
FIG. 10 is a schematic diagram of a longitudinal aberration of the camera optical lens shown in FIG. 9.
Figure 11:
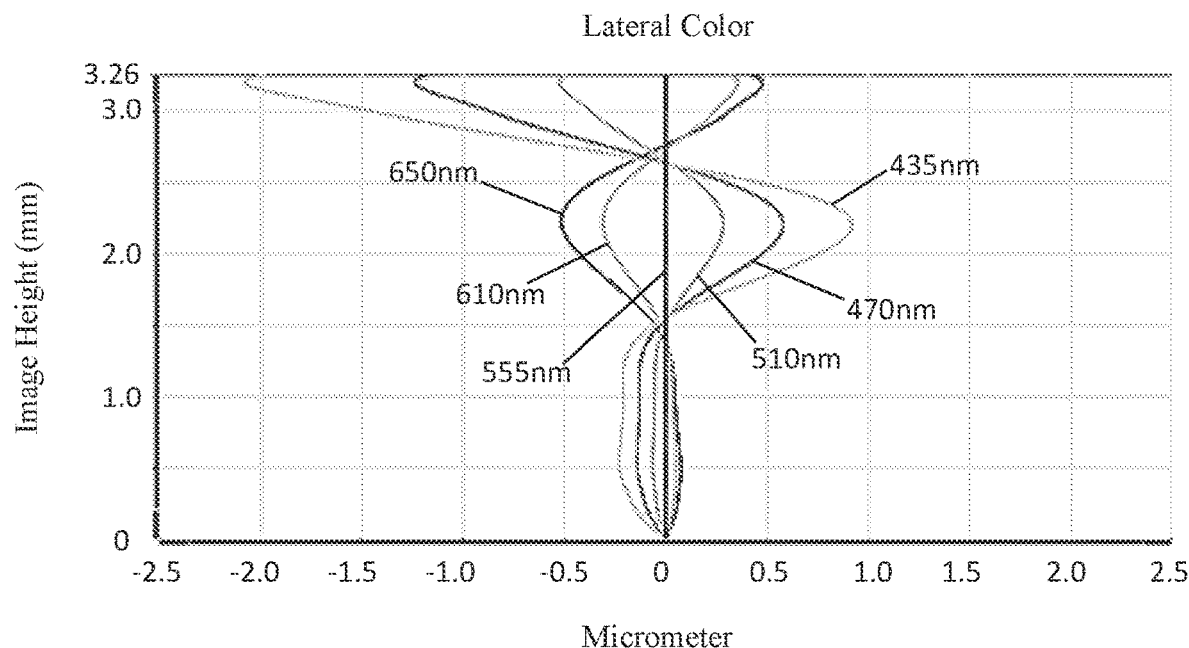
FIG. 11 is a schematic diagram of a lateral color of the camera optical lens shown in FIG. 9.
Figure 12:
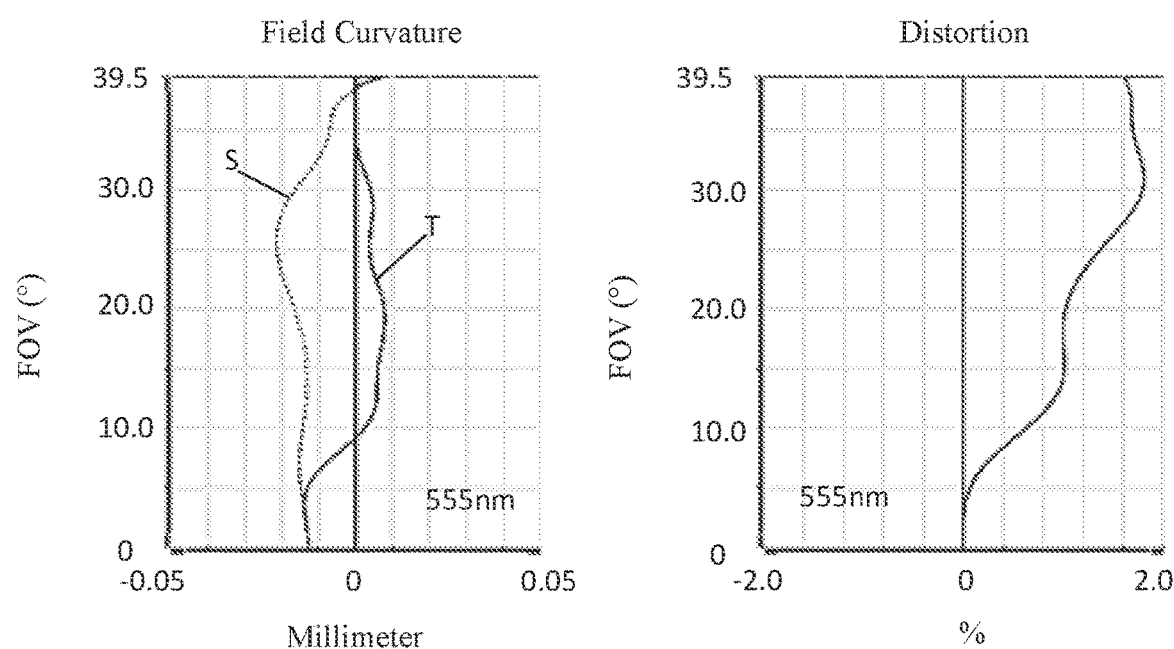
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm, 470 nm and 435 nm after passing the camera optical lens 30. FIG. 12 illustrates a field curvature and a distortion of light with a wavelength of 555 nm after passing the camera optical lens 30, in which a field curvature S is a field curvature in a sagittal direction, and T is a field curvature in a tangential direction.

In the present embodiment, the entrance pupil diameter ENPD of the camera optical lens 30 is 2.302 mm, the image height IH is 3.259 mm, the FOV (field of view) along a diagonal direction is 79.00°, such that the camera optical lens 30 can satisfy design requirements of ultra-thin, large-aperture and wide-angle while on-axis and off-axis aberrations are sufficiently corrected, thereby leading to better optical characteristics.

Further, Table 13 includes various values of Embodiment 1, Embodiment 2, and Embodiment 3 and parameters which are specified in the above conditions.

TABLE 13

| Parameters and Conditions | Embodiment 1 | Embodiment 2 | Embodiment 3 |
|---|---|---|---|
| v1 | 74.64 | 59.46 | 81.60 |
| f2/f | −4.17 | −3.53 | −5.40 |
| f | 3.773 | 3.734 | 3.798 |
| f1 | 3.867 | 3.764 | 4.074 |
| f2 | −15.715 | −13.161 | −20.514 |
| f3 | −264.808 | 99.732 | 182.773 |
| f4 | 3.258 | 3.526 | 3.612 |

TABLE 13-continued

| Parameters and Conditions | Embodiment 1 | Embodiment 2 | Embodiment 3 |
|---|---|---|---|
| f5 | −2.527 | −2.719 | −2.541 |
| f12 | 4.675 | 4.783 | 4.669 |
| Fno | 1.65 | 1.65 | 1.65 |
| TTL | 4.590 | 4.590 | 4.591 |
| IH | 3.259 | 3.259 | 3.259 |
| FOV | 79.30° | 80.00° | 79.00° |

The above are only the embodiments of the present disclosure. It should be understand that those skilled in the art can make improvements without departing from the inventive concept of the present disclosure, and these improvements shall all belong to the scope of the present disclosure.

What is claimed is:

1. A camera optical lens, comprising, from an object side to an image side:
a first lens having a positive refractive power,
a second lens having a negative refractive power,
a third lens,
a fourth lens having a positive refractive power, and
a fifth lens having a negative refractive power,
wherein the camera optical lens satisfies following conditions:

$3.00 \leq R9/R10 \leq 6.00$, $58.00 \leq v1 \leq 82.00$, and $-5.50 \leq f2/f \leq -3.50$, where
R9 denotes a curvature radius of an object side surface of the fifth lens,
R10 denotes a curvature radius of an image side surface of the fifth lens,
f denotes a focal length of the camera optical lens,
f2 denotes a focal length of the second lens, and
v1 denotes an abbe number of the first lens.

2. The camera optical lens as described in claim 1, further satisfying a following condition:

$0.80 \leq d6/d8 \leq 1.20$, where
d6 denotes an on-axis distance from an image side surface of the third lens to an object side surface of the fourth lens, and
d8 denotes an on-axis distance from an image side surface of the fourth lens to an object side surface of the fifth lens.

3. The camera optical lens as described in claim 1, further satisfying following conditions:

$0.50 \leq f1/f \leq 1.61$, $-4.22 \leq (R1+R2)/(R1-R2) \leq -1.27$, and $0.07 \leq d1/TTL \leq 0.23$, where
f1 denotes a focal length of the first lens,
R1 denotes a curvature radius of an object side surface of the first lens,
R2 denotes a curvature radius of an image side surface of the first lens,
d1 denotes an on-axis thickness of the first lens, and TTL denotes a total optical length from the object side surface of the first lens to an image plane of the camera optical lens along an optic axis.

4. The camera optical lens as described in claim 1, further satisfying following conditions:

$$1.20 \leq (R3+R4)/(R3-R4) \leq 11.57, \text{ and}$$

$$0.02 \leq d3/\text{TTL} \leq 0.07,$$

where

R3 denotes a curvature radius of an object side surface of the second lens,

R4 denotes a curvature radius of an image side surface of the second lens, d3 denotes an on-axis thickness of the second lens, and TTL denotes a total optical length from an object side surface of the first lens to an image plane of the camera optical lens along an optic axis.

5. The camera optical lens as described in claim 1, further satisfying following conditions:

$$-140.37 \leq f3/f \leq 72.19,$$

$$1.41 \leq (R5+R6)/(R5-R6) \leq 18.52, \text{ and}$$

$$0.04 \leq d5/\text{TTL} \leq 0.16,$$

where f3 denotes a focal length of the third lens,

R5 denotes a curvature radius of an object side surface of the third lens,

R6 denotes a curvature radius of an image side surface of the third lens, d5 denotes an on-axis thickness of the third lens, and TTL denotes a total optical length from an object side surface of the first lens to an image plane of the camera optical lens along an optic axis.

6. The camera optical lens as described in claim 1, further satisfying following conditions:

$$0.43 \leq f4/f \leq 1.43,$$

$$0.33 \leq (R7+R8)/(R7-R8) \leq 1.48, \text{ and}$$

$$0.06 \leq d7/\text{TTL} \leq 0.20,$$

where f4 denotes a focal length of the fourth lens,

R7 denotes a curvature radius of an object side surface of the fourth lens,

R8 denotes a curvature radius of an image side surface of the fourth lens, d7 denotes an on-axis thickness of the fourth lens, and TTL denotes a total optical length from an object side surface of the first lens to an image plane of the camera optical lens along an optic axis.

7. The camera optical lens as described in claim 1, further satisfying following conditions:

$$-1.46 \leq f5/f \leq -0.45,$$

$$0.70 \leq (R9+R10)/(R9-R10) \leq 2.73, \text{ and}$$

$$0.03 \leq d9/\text{TTL} \leq 0.11,$$

where f5 denotes a focal length of the fifth lens,

R9 denotes a curvature radius of an object side surface of the fifth lens,

R10 denotes a curvature radius of an image side surface of the fifth lens, d9 denotes an on-axis thickness of the fifth lens, and TTL denotes a total optical length from an object side surface of the first lens to an image plane of the camera optical lens along an optic axis.

8. The camera optical lens as described in claim 1, further satisfying a following condition:

$$\text{FNO} \leq 1.66,$$

where

FNO denotes an F number of the camera optical lens.

9. The camera optical lens as described in claim 1, further satisfying a following condition:

$$\text{TTL/IH} \leq 1.41,$$

where

IH denotes an image height of the camera optical lens, and

TTL denotes a total optical length from an object side surface of the first lens to an image plane of the camera optical lens along an optic axis.

10. The camera optical lens as described in claim 1, wherein the first lens is made of a glass material.

* * * * *